(12) United States Patent
Gu

(10) Patent No.: US 8,970,153 B2
(45) Date of Patent: Mar. 3, 2015

(54) APPARATUS AND METHOD FOR CONTROLLING SPEED OF MOTOR

(71) Applicant: Samsung Electro-Mechanics Co. Ltd., Gyeonggi-do (KR)

(72) Inventor: Bon Young Gu, Suwon-si (KR)

(73) Assignee: Samsung Electro-Mechanics Co., Ltd., Gyeonggi-Do (KR)

( * ) Notice: Subject to any disclaimer, the term of this patent is extended or adjusted under 35 U.S.C. 154(b) by 189 days.

(21) Appl. No.: 13/802,501

(22) Filed: Mar. 13, 2013

(65) Prior Publication Data

US 2014/0062369 A1 Mar. 6, 2014

(30) Foreign Application Priority Data

Sep. 5, 2012 (KR) .................. 10-2012-0098173

(51) Int. Cl.
*G05B 5/00* (2006.01)
*H02P 29/00* (2006.01)

(52) U.S. Cl.
CPC ........ *H02P 29/0005* (2013.01); *H02P 2205/07* (2013.01)
USPC ............................. 318/461; 318/268; 318/439

(58) Field of Classification Search
USPC ............ 318/461, 400.01, 810, 268, 439, 599, 318/603, 280, 286
See application file for complete search history.

(56) References Cited

U.S. PATENT DOCUMENTS 7,323,838 B2 * 1/2008 Ma et al. ........................ 318/268
2004/0267421 A1 12/2004 Eskritt et al.

FOREIGN PATENT DOCUMENTS

JP 2011120421 6/2011
KR 10-2010-0041794 4/2010
KR 10-2010-0108676 10/2010

* cited by examiner

*Primary Examiner* — Karen Masih
(74) *Attorney, Agent, or Firm* — Bracewell & Giuliani LLP; Brad Y. Chin

(57) ABSTRACT

An apparatus for controlling a speed of a motor, includes: a first duty change detection unit detecting a change in duty of a PWM signal supplied from the outside; a speed conversion unit converting a speed indication (command) having the PWM signal into an actual speed value (RPM value) based on the change in duty detected by the first duty change detection unit; a speed control unit generating a new speed indication value to be applied to a motor and determining the duty value of PWM signal based on the new speed indication value; a second duty change detection unit detecting the change in the duty value of PWM signal determined by the speed control unit; and a PWM generation unit generating the PWM signal actually applied to the motor based on the change in the duty value detected by the second duty change detection unit.

14 Claims, 4 Drawing Sheets

- PRIOR ART -

APPARATUS AND METHOD FOR CONTROLLING SPEED OF MOTOR

CROSS REFERENCE(S) TO RELATED APPLICATIONS

This application claims the benefit under 35 U.S.C. Section 119 of Korean Patent Application Serial No. 10-2012-0098173 entitled "Apparatus And Method For Controlling Speed Of Motor" filed on Sep. 5, 2012, which is hereby incorporated by reference in its entirety into this application.

BACKGROUND OF THE INVENTION

1. Technical Field

The present invention relates to an apparatus and a method for controlling a speed of a motor, and more particularly, to an apparatus and a method for controlling a speed of a motor capable of reducing noise and vibration generated from a motor due to a sudden change in speed, by changing sudden speed variation (indicating a change in speed) as much as a specific ratio for every constant period at the time of controlling a speed of a motor and applying the changed speed variation to the motor step-by-step.

2. Description of the Related Art

Various configurations of a motor control circuit have been known. One of the configurations is the very H-bridge or full bridge configuration. In the H-bridge or full-bridge configuration, four transistors form an H pattern, together with a motor coil connected so as to form an H-shaped bridge. Transistor switches are formed in pair and are controlled. When a first switch pair is conducted, a first voltage signal is applied to the motor coil to generate current flowing in a first direction to the coil and when a second switch pair is conducted, a second voltage signal is applied to the motor coil to generate current flowing in an opposite direction to the coil. A speed of a motor is controlled according to a turn-on/off ratio of the transistor pairs.

FIG. 1 is a diagram schematically illustrating a configuration of an example of an apparatus for controlling a speed of a motor according to the related art.

Referring to FIG. 1, the apparatus for controlling a speed of a motor according to the related art is configured to include: a duty detection unit 110 that detects a duty according to a speed indication (command) having a pulse width modulation (PWM) signal form supplied from the outside; a speed conversion unit 120 that converts the speed indication (command) into an actual speed value (RPM value) based on the duty detected by the duty detection unit 110; a speed detection unit 130 that detects the actual speed of a motor 170; an error calculation unit 140 that calculates a difference (error) between a speed detected by the speed detection unit 130 and a speed converted by the speed conversion unit 120; a speed control unit 150 that outputs a new speed indication value to the motor 170 based on the speed error obtained by the error calculation unit 140; and a PWM generation unit 160 that generates the PWM signal actually applied to the motor 170 based on the speed indication value output from the speed control unit 150.

However, in the apparatus for controlling a speed of a motor according to the related art having the foregoing configuration, when the speed of the motor 170 is suddenly changed, overcurrent flows in a rotator and/or stator winding of the motor 170, such that the motor generates noise and vibration.

RELATED ART DOCUMENT

Patent Document (Patent Document 1) Korea Patent Laid-Open Publication No. 10-2010-0041794
(Patent Document 2) JP Patent Laid-Open Publication No. 2011-120421

SUMMARY OF THE INVENTION

An object of the present invention is to provide an apparatus and a method for controlling a speed of a motor capable of reducing noise and vibration generated from a motor due to a sudden change in speed, by changing sudden speed variation (indicating a change in speed) as much as a specific ratio for every constant period at the time of controlling a speed of a motor and applying the changed speed variation to the motor step-by-step.

According to an exemplary embodiment of the present invention, there is provided an apparatus for controlling a speed of a motor, including: a first duty change detection unit detecting a change in duty of a PWM signal supplied from the outside; a speed conversion unit converting a speed indication (command) having a PWM signal form supplied from the outside into an actual speed value (RPM value) based on the change in duty detected by the first duty change detection unit; a speed control unit generating a new speed indication value to be applied to a motor based on a difference between the indication speed (reference speed) converted by the speed conversion unit and a current speed (detection speed) of the motor and determining the duty value of PWM based on the new speed indication value; a second duty change detection unit detecting the change in the duty value of PWM determined by the speed control unit; and a PWM generation unit generating the PWM signal actually applied to the motor based on the change in the duty value detected by the second duty change detection unit.

The apparatus for controlling a speed of a motor may further include: a duty detection unit disposed before the first duty change detection unit to detect the duty according to the speed indication (command) having the PWM signal form supplied from the outside and provide the detected results to the first duty change detection unit.

The apparatus for controlling a speed of a motor may further include: a speed detection unit detecting the current speed (actual speed) of the motor and providing the detected speed to the speed control unit.

The apparatus for controlling a speed of a motor may further include: an error calculation unit calculating a difference (error) between a speed detected by the speed detection unit and an indication speed (reference speed) converted by the speed conversion unit and providing the calculated results to the speed control unit.

The apparatus for controlling a speed of a motor may further include a duty generation unit disposed between the second duty change detection unit and the PWM generation unit to periodically update the duty value according to the change in the duty value detected by the second duty change detection unit.

The PWM generation unit may control maximum variation of the duty value of the PWM signal actually applied to the motor.

The PWM generation unit may change step-by-step the maximum variation of the duty value of the PWM signal as much as a predetermined specific ratio for every period of the PWM signal at the time of controlling the maximum variation of the duty value of the PWM signal.

According to another exemplary embodiment of the present invention, there is provided a method for controlling a speed of a motor by an apparatus for controlling a speed of a motor including a first duty change detection unit, a speed conversion unit, a speed control unit, a second duty change detection unit, a PWM generation unit, the method including: a) detecting, by the first duty change detection unit, a change in duty of a PWM signal supplied from the outside; b) converting, by the speed conversion unit, a speed indication (command) having a PWM signal form supplied from the outside into an actual speed value (RPM value) based on the change in the detected duty, c) generating, by the speed control unit, a new speed indication value to be applied to a motor based on a difference between the indication speed (reference speed) converted by the speed conversion unit and a current speed (detection speed) of the motor and determining the duty value of the PWM signal based on the new speed indication value, d) detecting, by the second duty change detection unit, the change in the duty value of the PWM signal determined by the speed control unit; and e) generating, by the PWM generation unit, the PWM signal actually applied to the motor based on the change in the duty value detected by the second duty change detection unit.

The method for controlling a speed of a motor may further include: prior to the step a), detecting, by the duty detection unit, the duty according to the speed indication (command) having the PWM signal form supplied from the outside and providing the detected results to the first duty change detection unit.

The method for controlling a speed of a motor, may further include: prior to the step c), detecting, by the speed detection unit, the current speed (actual speed) of the motor and providing the detected result to the speed detection unit.

The method for controlling a speed of a motor, may further include: prior to the step c), calculating, by an error calculation unit, a difference (error) between the speed detected by the speed detection unit and the indication speed (reference speed) converted by the speed conversion unit and providing the calculated results to the speed control unit.

The method for controlling a speed of a motor, may further include: after the step d), periodically updating, by the duty generation unit, the duty value based on the change in the duty value detected by the second duty change detection unit.

In the step e), the maximum variation of the duty value of the PWM signal actually applied to the motor may be controlled by the PWM generation unit.

The method for controlling a speed of a motor, may further include: changing step-by-step, by the PWM generation unit, the maximum variation of the duty value of the PWM signal as much as a predetermined specific ratio for every period of the PWM signal at the time of controlling the maximum variation of the duty value of the PWM signal.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Throughout the present specification, unless explicitly described to the contrary, "comprising" any components will be understood to imply the inclusion of other elements rather than the exclusion of any other elements. A term "part", "module", "unit", or the like, described in the specification means a unit of processing at least one function or operation and may be implemented by hardware or software or a combination of hardware and software.

Hereinafter, exemplary embodiments of the present invention will be described in detail with reference to the accompanying drawings.

Figure 1:
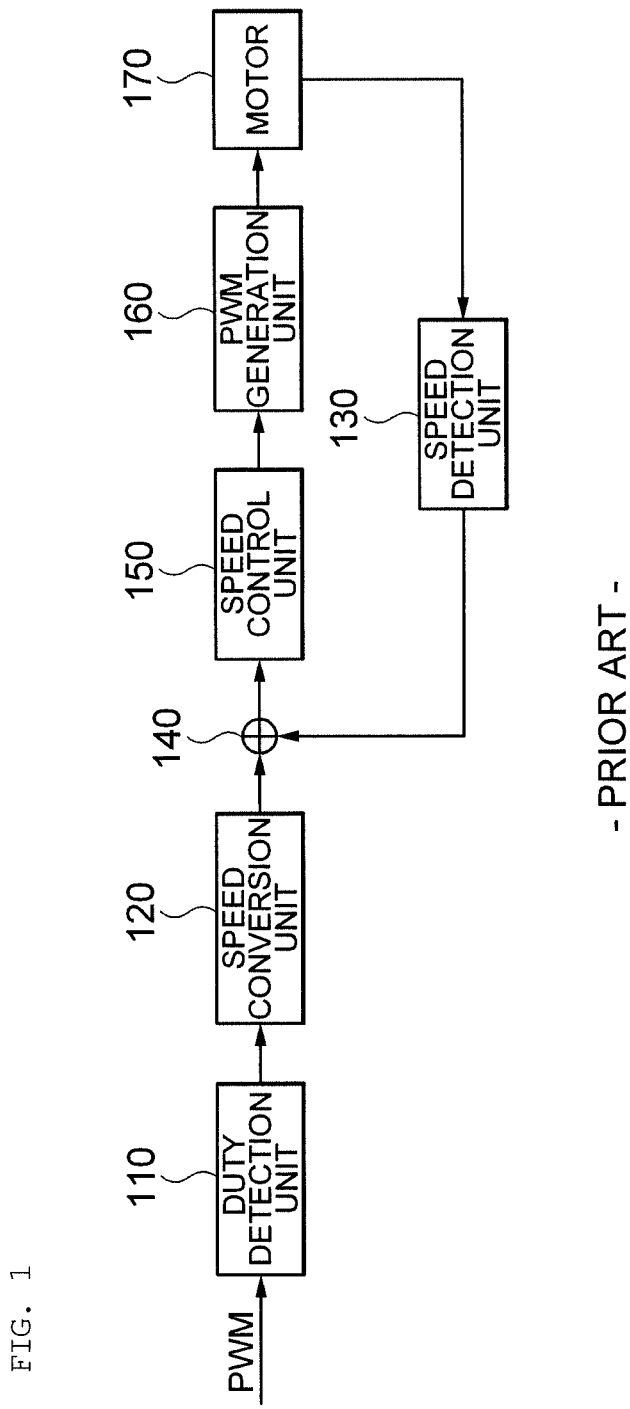
FIG. 1 is a diagram schematically illustrating a configuration of an example of an apparatus for controlling a speed of a motor according to the related art.
Figure 2:
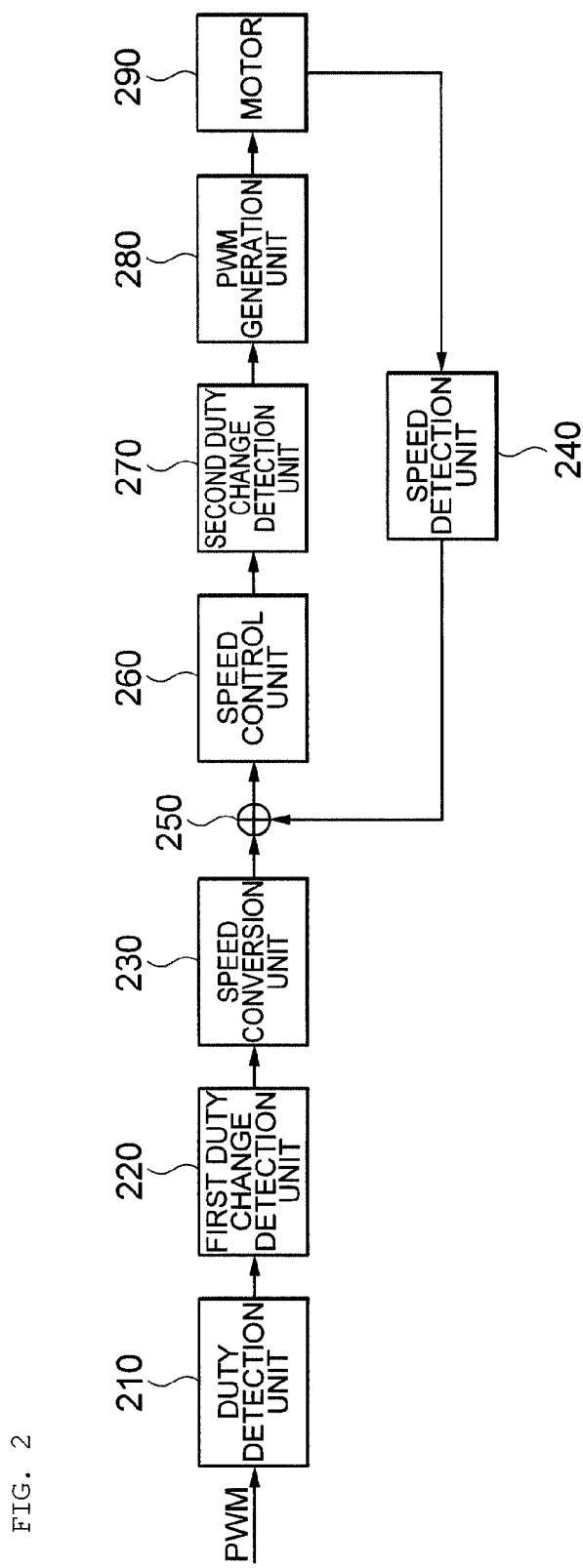
FIG. 2 is a diagram schematically illustrating a configuration of an apparatus for controlling a speed of a motor according to an exemplary embodiment of the present invention.

FIG. 2 is a diagram schematically illustrating a configuration of an apparatus for controlling a speed of a motor according to an exemplary embodiment of the present invention.

Referring to FIG. 2, an apparatus for controlling a speed of a motor according to an exemplary embodiment of the present invention is configured to include a first duty change detection unit 220, a speed conversion unit 230, a speed control unit 260, a second duty change detection unit 270, and a PWM generation unit 280.

The first duty change detection unit 220 detects a change in duty of a PWM signal supplied from the outside. Preferably, the apparatus for controlling a speed of a motor further includes a duty detection unit 210 disposed before the first duty change detection unit 220 to detect the duty from a speed indication (command) having a PWM signal form supplied from the outside and provide the detected results to the first duty change detection unit 220.

Herein, the duty detection by the duty detection unit 210 will be additionally described.

The duty detection unit 210 detects a duty value of a pulse width modulated high or low signal from the speed indication (command) having the PWM signal form supplied from the outside. For example, when one period of the pulse width modulated signal is set to be 50 μs and time in which the signal is high or low is set to be 30 μs, the duty value of the pulse width modulated high or low becomes (30 μs/50 μs)×100%=60%. In this way, the duty detection unit 210 detects the duty value of the PWM signal (that is, the pulse width modulated high or low signal) supplied from the outside. Therefore, the first duty change detection unit 220 detects the change in duty of the PWM signal based on the duty value detected by the duty detection unit 210. Herein, the change in duty means that the speed indication is changed. The change in duty may be due to the change of the speed indication value from the outside and may be due to the change in duty of the PWM that is internally generated.

The speed conversion unit 230 converts the speed indication (command) having the PWM signal form supplied from the outside into an actual speed value (RPM value) based on the change in duty detected by the first duty change detection unit 220.

The speed control unit 260 generates a new speed indication value to be applied to a motor 290 based on a difference between the indication speed (reference speed) converted by the speed conversion unit 230 and a current speed (detection speed) of the motor 290 and determines the duty value of the PWM based on the new speed indication value.

Preferably, an error calculation unit 250 calculating the difference (error) between the speed detected by the speed detection unit 240 to be describe below and the indication speed (reference speed) converted by the speed conversion unit 230 and providing the calculated results to the speed control unit 260 is further disposed between the speed conversion unit 230 and the speed control unit 260.

The second duty change detection unit 270 detects the change in duty value of the PWM determined by the speed control unit 260.

The PWM generation unit 280 generates the PWM signal actually applied to the motor 290 based on the change in the duty value detected by the second duty change detection unit 270.

Preferably, as illustrated in FIG. 2, the speed detection unit 240 detecting the current speed (actual speed) of the motor 290 and providing the detected speed to the speed control unit 260 is further disposed between the motor 290 and the error calculation unit 250.

Figure 3:
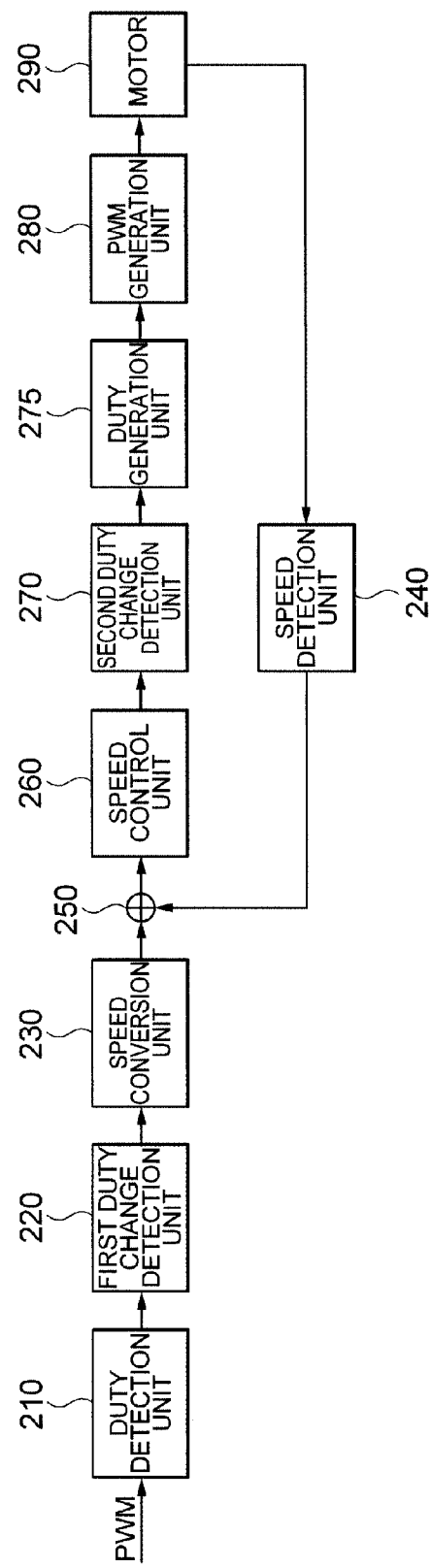
FIG. 3 is a diagram schematically illustrating a configuration of an apparatus for controlling a speed of a motor according to another exemplary embodiment of the present invention.

Further, as illustrate in FIG. 3, a duty generation unit 275 is further disposed between the second duty change detection unit 270 and the PWM generation unit 280 to periodically update the duty value according to the change (that is, a change in current speed of the motor) 290 in the duty value detected by the second duty change detection unit 270.

Further, the PWM generation unit 280 controls maximum variation of the duty value of the PWM signal that is actually applied to the motor 290.

In this case, the PWM generation unit 280 changes step-by-step the maximum variation of the duty value of the PWM signal as much as a predetermined specific rate (for example, 0.1%) for every period of the PWM signal at the time of controlling the maximum variation of the duty value of the PWM signal. This is to reduce the sudden change in speed as described above to change step-by-step a speed, thereby reducing the vibration and noise generated from the motor 290.

Hereinafter, the method for controlling a speed of a motor by the apparatus for controlling a speed of a motor according to the exemplary embodiment of the present invention having the foregoing configuration will be described.

Figure 4:
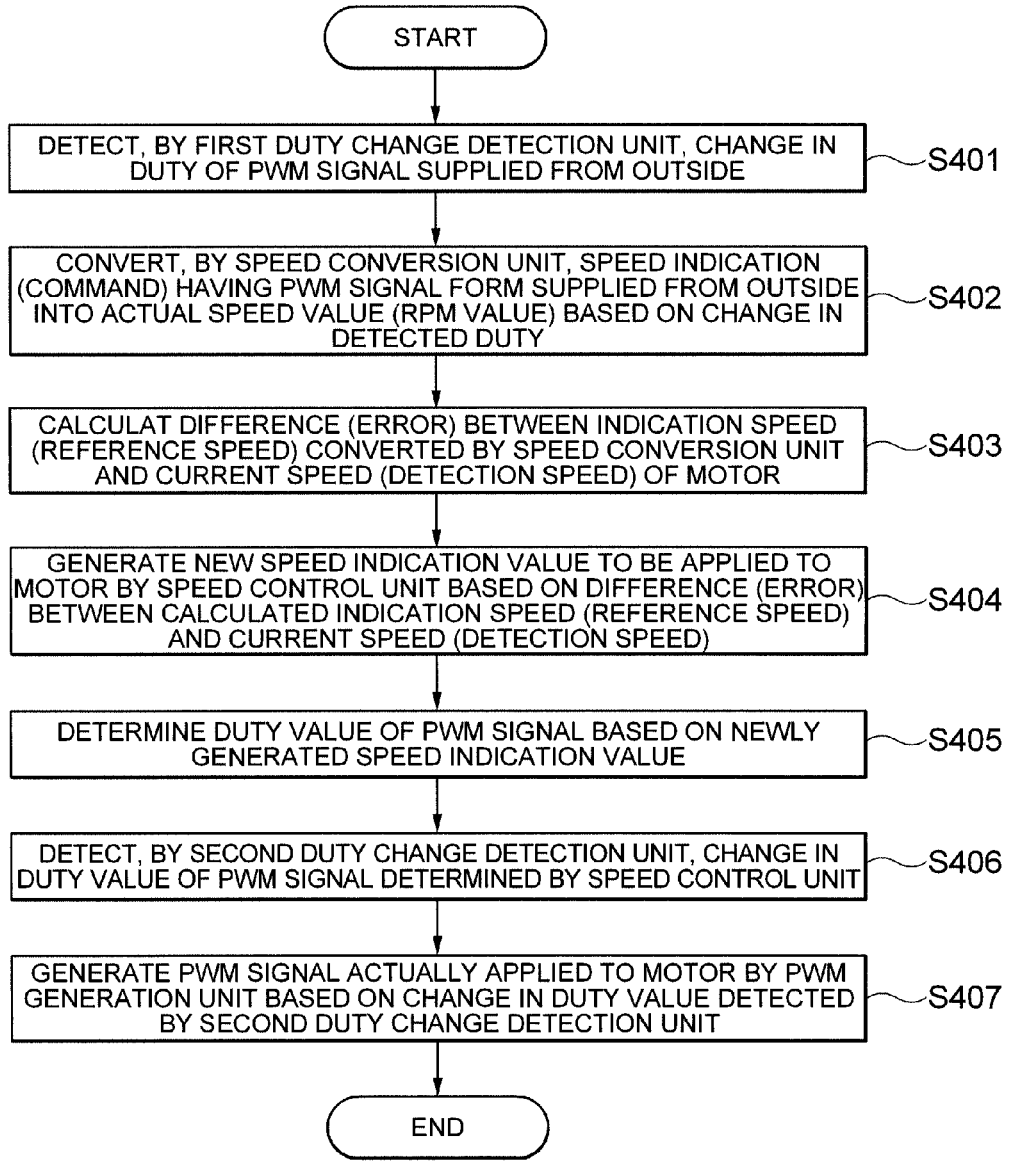
FIG. 4 is a flow chart illustrating a process of executing a method for controlling a speed of a motor according to an exemplary embodiment of the present invention.

FIG. 4 is a flow chart illustrating a process of executing a method for controlling a speed of a motor according to an exemplary embodiment of the present invention.

Referring to FIG. 4, the method for controlling a speed of a motor according to the exemplary embodiment of the present invention is a method for controlling a speed of a motor by the apparatus for controlling a speed of a motor including the first duty change detection unit 220, the speed conversion unit 230, the speed control unit 260, the second duty change detection unit 270, and the PWM generation unit 280 as described above and first detects the change in duty of the PWM signal supplied from the outside by the first duty change detection unit 220 (S401).

Next, the speed indication (command) having the PWM signal form supplied from the outside is converted into the actual speed value (RPM value) by the speed conversion unit 230 based on the change in the detected duty (S402).

Further, a new speed indication value to be applied to the motor 290 is generated by the speed control unit 260 based on the difference between the indication speed (reference speed) converted by the speed conversion unit 230 and the current speed (detection speed) of the motor 290 and the duty value of the PWM signal is determined based on the new speed indication value (S403 to S405). That is, the difference (error) between the indication speed (reference speed) converted by the speed conversion unit 230 and the current speed (detection speed) of the motor 290 is first calculated by the error calculation unit 250 (S403). Next, the new speed indication value to be applied to the motor 290 is generated by the speed control unit 260 based on the difference (error) between the calculated indication speed (reference speed) and the current speed (detection speed) (S404). Then, the duty value of the PWM signal is determined by the speed control unit 260 based on the newly generated speed indication value (S405).

In this way, when the duty value of the PWM signal is determined, the change in the duty value of the PWM signal determined by the speed control unit 260 is detected by the second duty change detection unit 270 (S406).

Next, the PWM signal actually applied to the motor 290 is generated by the PWM generation unit 280 based on the change in the duty value detected by the second duty change detection unit 270 (S407).

In the series of processes as described above, prior to S401, the method for controlling a speed of a motor further includes detecting the duty by the duty detection unit 210 based on the speed indication (command) having the PWM signal form supplied from the outside and providing the detected results to the first duty change detection unit 220.

In addition, prior to S403, the method for controlling a speed of a motor further includes detecting the current speed (actual speed) of the motor 290 by the speed detection unit 240 and providing the detected results to the speed control unit 260.

Further, after S406, the method for controlling a speed of a motor further includes periodically updating the duty value by the duty generation unit 275 based on the change (that is, the change in current speed of the motor 290) in the duty value detected by the second duty change detection unit 270.

Further, in S407, the maximum variation of the duty value of the PWM signal that is actually applied to the motor 290 is controlled by the PWM generation unit 280.

In this case, the PWM generation unit 280 changes step-by-step the maximum variation of the duty value of the PWM signal as much as a predetermined specific rate (for example, 0.1%) for every period of the PWM signal at the time of controlling the maximum variation of the duty value of the PWM signal. As described above, this is to reduce the sudden change in speed as described above to change step-by-step a speed, thereby reducing the vibration and noise generated from the motor 290.

As described above, the apparatus and method for controlling a speed of a motor according to the exemplary embodiments of the present invention can reduce the noise and vibration generated from the motor due to the sudden change in speed, by changing the sudden speed variation (indicating a change in speed) as much as a specific ratio for every constant period at the time of controlling the speed of a motor and applying the changed speed variation to the motor step-by-step, thereby maintaining the stabilized operation of a motor.

As described above, the present invention will be described with reference to the exemplary embodiments, but is not limited thereto. It can be apparent to those skilled in the art that the exemplary embodiments of present invention can be variously changed and applied within the scope of the present invention without departing from the technical idea of the present invention. Therefore, the protection scope of the present invention must be construed by the appended claims and it should be construed that all spirits within a scope equivalent thereto are included in the appended claims of the present invention.

What is claimed is:

1. An apparatus for controlling a speed of a motor, comprising:
a first duty change detection unit detecting a change in duty of a PWM signal supplied from the outside;
a speed conversion unit converting a speed indication (command) having a PWM signal form supplied from the outside into an actual speed value (RPM value) based on the change in duty detected by the first duty change detection unit;
a speed control unit generating a new speed indication value to be applied to a motor based on a difference between the indication speed (reference speed) converted by the speed conversion unit and a current speed (detection speed) of the motor and determining the duty value of PWM based on the new speed indication value;
a second duty change detection unit detecting the change in the duty value of PWM determined by the speed control unit; and
a PWM generation unit generating the PWM signal actually applied to the motor based on the change in the duty value detected by the second duty change detection unit.

2. The apparatus according to claim 1, further comprising:
a duty detection unit disposed before the first duty change detection unit to detect the duty according to the speed indication (command) having the PWM signal form supplied from the outside and provide the detected results to the first duty change detection unit.

3. The apparatus according to claim 1, further comprising:
a speed detection unit detecting the current speed (actual speed) of the motor and providing the detected speed to the speed control unit.

4. The apparatus according to claim 3, further comprising:
an error calculation unit calculating a difference (error) between a speed detected by the speed detection unit and an indication speed (reference speed) converted by the speed conversion unit and providing the calculated results to the speed control unit.

5. The apparatus according to claim 1, further comprising:
a duty generation unit disposed between the second duty change detection unit and the PWM generation unit to periodically update the duty value according to the change in the duty value detected by the second duty change detection unit.

6. The apparatus according to claim 1, wherein the PWM generation unit controls maximum variation of the duty value of the PWM signal actually applied to the motor.

7. The apparatus according to claim 6, wherein the PWM generation unit changes step-by-step the maximum variation of the duty value of the PWM signal as much as a predetermined specific ratio for every period of the PWM signal at the time of controlling the maximum variation of the duty value of the PWM signal.

8. A method for controlling a speed of a motor by an apparatus for controlling a speed of a motor including a first duty change detection unit, a speed conversion unit, a speed control unit, a second duty change detection unit, a PWM generation unit, the method comprising:
a) detecting, by the first duty change detection unit, a change in duty of a PWM signal supplied from the outside;
b) converting, by the speed conversion unit, a speed indication (command) having a PWM signal form supplied from the outside into an actual speed value (RPM value) based on the change in the detected duty;
c) generating, by the speed control unit, a new speed indication value to be applied to a motor based on a difference between the indication speed (reference speed) converted by the speed conversion unit and a current speed (detection speed) of the motor and determining the duty value of the PWM signal based on the new speed indication value;
d) detecting, by the second duty change detection unit, the change in the duty value of the PWM signal determined by the speed control unit; and
e) generating, by the PWM generation unit, the PWM signal actually applied to the motor based on the change in the duty value detected by the second duty change detection unit.

9. The method according to claim 8, further comprising:
prior to the step a), detecting, by the duty detection unit, the duty according to the speed indication (command) having the PWM signal form supplied from the outside and providing the detected results to the first duty change detection unit.

10. The method according to claim 8, further comprising:
prior to the step c), detecting, by the speed detection unit, the current speed (actual speed) of the motor and providing the detected result to the speed control unit.

11. The method according to claim 10, further comprising:
prior to the step c), calculating, by an error calculation unit, a difference (error) between the speed detected by the speed detection unit and the indication speed (reference speed) converted by the speed conversion unit and providing the calculated results to the speed control unit.

12. The method according to claim 8, further comprising:
after the step d), periodically updating, by the duty generation unit, the duty value based on the change in the duty value detected by the second duty change detection unit.

13. The method according to claim 8, wherein: in the step e), the maximum variation of the duty value of the PWM signal actually applied to the motor is controlled by the PWM generation unit.

14. The method according to claim 13, further comprising:
changing step-by-step, by the PWM generation unit, the maximum variation of the duty value of the PWM signal as much as a predetermined specific ratio for every period of the PWM signal at the time of controlling the maximum variation of the duty value of the PWM signal.

* * * * *